United States Patent
Kawahara et al.

(10) Patent No.: US 11,424,824 B2
(45) Date of Patent: Aug. 23, 2022

(54) OSNR SPECTRUM ESTIMATION APPARATUS, OSNR SPECTRUM ESTIMATION METHOD, AND PROGRAM

(71) Applicant: Nippon Telegraph and Telephone Corporation, Tokyo (JP)

(72) Inventors: Hiroki Kawahara, Tokyo (JP); Kohei Saito, Tokyo (JP); Takeshi Seki, Tokyo (JP); Tsutomu Kubo, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/270,713

(22) PCT Filed: Aug. 14, 2019

(86) PCT No.: PCT/JP2019/031898
§ 371 (c)(1),
(2) Date: Feb. 23, 2021

(87) PCT Pub. No.: WO2020/040011
PCT Pub. Date: Feb. 27, 2020

(65) Prior Publication Data
US 2021/0351842 A1    Nov. 11, 2021

(30) Foreign Application Priority Data

Aug. 24, 2018    (JP) .............................. JP2018-157606

(51) Int. Cl.
*H04B 10/07* (2013.01)
*H04B 10/079* (2013.01)
(Continued)

(52) U.S. Cl.
CPC ..... *H04B 10/07953* (2013.01); *H04B 10/516* (2013.01); *H04J 14/02* (2013.01)

(58) Field of Classification Search
CPC .. H04B 10/07953; H04B 10/516; H04J 14/02
See application file for complete search history.

(56) References Cited

U.S. PATENT DOCUMENTS

2016/0373187 A1* 12/2016 Oda ................. H04B 10/07953
2019/0097720 A1*  3/2019 Kim .................... H04J 14/0227
(Continued)

OTHER PUBLICATIONS

Geisler et al., "The First Testbed Demonstration of a Flexible Bandwidth Network with a Real-Time Adaptive Control Plane," IEEE, Sep. 2011, 3 pages.

(Continued)

*Primary Examiner* — Dzung D Tran
(74) *Attorney, Agent, or Firm* — Fish & Richardson P.C.

(57) ABSTRACT

An OSNR spectrum estimation apparatus includes an OSNR estimation unit configured to cause an optical node to estimate an OSNR of a predetermined transmission line using a probe light of a predetermined wavelength in a predetermined number of wavelength channels, the predetermined number being less than the number of all wavelength channels; and an OSNR spectrum calculation unit configured to calculate an OSNR spectrum of all the wavelength channels from OSNRs of the predetermined number of wavelength channels measured by the optical node.

18 Claims, 8 Drawing Sheets

(51) Int. Cl.
*H04B 10/516* (2013.01)
*H04J 14/02* (2006.01)

(56) References Cited

U.S. PATENT DOCUMENTS

2019/0190604 A1* 6/2019 Kilper ................. H04J 14/0278
2019/0253361 A1* 8/2019 MacKay ............... H04L 41/147
2019/0296851 A1* 9/2019 Jiang ................ H04B 10/07953

OTHER PUBLICATIONS

Okamoto et al., "400 Gbit/s/ch Field Demonstration of Modulation Format Adaptation Based on Pilot-Aided OSNR Estimation Using Real-Time DSP," IEICE Trans. Commun., Oct. 2017, E100-B(10):1726-1733, 8 pages.

Tanimura et al., "Data-analytics-based Optical Performance Monitoring Technique for Optical Transport Networks," OFC, 2018, 3 pages.

Yoshida et al., "Prototype of OSNR Monitor Unit and Photonic Node for Dynamic and Flexible Photonic Networks," Institute of Electronics, Information and Communication Engineers, 2018, pp. 37-42, 13 pages (with English Translation).

* cited by examiner

OSNR SPECTRUM ESTIMATION APPARATUS, OSNR SPECTRUM ESTIMATION METHOD, AND PROGRAM

CROSS-REFERENCE TO RELATED APPLICATIONS

This application is a National Stage application under 35 U.S.C. § 371 of International Application No. PCT/JP2019/031898, having an International Filing Date of Aug. 14, 2019, which claims priority to Japanese Application Serial No. 2018-157606, filed on Aug. 24, 2018. The disclosure of the prior application is considered part of the disclosure of this application, and is incorporated in its entirety into this application.

TECHNICAL FIELD

The present invention relates to an optical signal to noise ratio (OSNR) spectrum estimation apparatus, an OSNR spectrum estimation method, and a program.

BACKGROUND ART

In recent years, there has been an increase in the diversification of network operation patterns, such as providers who build their own optical networks and virtual network operators (VNOs) who provide communication services using other company's communication infrastructure. As a result, the importance of dynamic and flexible optical networks that are easily built and operated, flexible, and highly efficient has been rapidly increasing, in addition to the traditional requirements such as high speed, high capacity and high reliability.

Conventional optical networks have guaranteed high reliability by fixed operation with a network configuration that can guarantee the transmission quality in advance through advance design. However, the state of the optical network constantly changes when the route of the transmission signals is frequently changed. Therefore, the route change associated with offering of new service of the optical network entails a man-hour and time for designing in advance the optical network after the change.

To maintain reliability and flexibility at the same time without sacrificing the speed for the offering of new service of the optical network, a higher-level device needs to monitor the signal quality of the optical network to control overall optimization. Therefore, a real-time monitoring system (NPL 1) for an optical transmission line condition and signal quality have been researched and developed. Its application includes identification of factors and locations of signal quality degradation and determination of signal quality at the time of opening an optical path (transmission line).

A main parameter representing a transmission line state is an OSNR, which indicates an optical signal to noise power ratio. The OSNR depends on operating conditions (gain, input power, wavelength distribution, etc.) of an optical amplifier, and varies with time due to aging degradation and/or changes in environmental conditions. As such, it is difficult to predict the OSNR from parameters. In addition, degradation of the OSNR largely depends on an amplified spontaneous emission (ASE) noise, which is added by an optical amplifier disposed in each optical node of a transmission system. Therefore, it is desirable to measure the OSNR for each optical amplifier or each transmission span.

NPLs 2 and 3 disclose techniques for estimating an end-to-end OSNR in a receiver, and NPL 4 discloses a technique for estimating an OSNR of each link by an optical spectrum analyzer (OSA) at each node. Further, techniques using a combination of them have also been proposed.

CITATION LIST

Non Patent Literature

NPL 1: D. J. Geisier et al., "The First Testbed Demonstration of a Flexible Bandwidth Network with a Real-Time Adaptive Control Plane", ECOC2016, postdeadline, Th13. K. 2.
NPL 2: S. Okamoto et al., "400 Gbit/s/ch Field Demonstration of Modulation Format Adaptation Based on Pilot-Aided OSNR Estimation Using Real-Time DSP", IEICE TRANS. COMMUN., vol. E100-B, No. 10, 2017.
NPL 3: T. Tanimura et al., "Data-analysis-based Optical Performance Monitoring Technique for Optical Transport Networks", OFC2018.
NPL 4: "Prototype of OSNR Monitor Unit and Optical Node for Dynamic and Flexible Photonic Networks", Institute of Electronics, Information and Communication, OCS201817

SUMMARY OF THE INVENTION

Technical Problem

To measure (estimate) an OSNR for each wavelength channel of an optical path of a transmission line, it is conceivable that a receiver or an optical spectrum analyzer performs measurement (estimation) by sequentially switching all wavelength channels (grid search), for example. While the measurement method in this case is simple, the measurement time is significantly long, and a large amount of measured data is required to be transferred to and processed by a network controller. In particular, the amount of the measurement data (traffic) from the optical spectrum analyzer at each node is significantly large due to a large number of monitoring locations.

Under such circumstances, an object of the present invention is to reduce traffic by completing estimation of an OSNR spectrum of a transmission line with a small number of measurements and in a short period of time while maintaining accuracy.

Means for Solving the Problem

In order to solve the above-described problem, the invention according to a first aspect is an OSNR spectrum estimation apparatus including an estimation unit configured to cause an optical node to estimate an OSNR of a predetermined transmission line in a predetermined number of wavelength channels, the predetermined number being less than the number of all wavelength channels, and a calculation unit configured to calculate an average value and a variance of an OSNR spectrum of all the wavelength channels and an OSNR minimum value or an OSNR maximum value from OSNRs of the predetermined number of wavelength channels measured by the optical node.

In this manner, according to the present invention, the estimation of the OSNR spectrum of the transmission line can be completed with a small number of measurements and in a short period of time, and the traffic can be reduced.

The invention according to a second aspect is the OSNR spectrum estimation apparatus according to the first aspect in which the estimation unit calculates the OSNR spectrum of all the wavelength channels by determining an average value and a variance of a posterior distribution by Gaussian process regression based on an OSNR measurement result by using probe light of a predetermined wavelength channel.

In this manner, according to the present invention, the estimation of the OSNR spectrum can be completed with a small number of measurements and in a short period of time, and the traffic can be reduced.

The invention according to a third aspect is the OSNR spectrum estimation apparatus according to the second aspect in which the estimation unit sets, as a wavelength channel to be measured next, a wavelength channel that gives a maximum value of an acquisition function in which a smallness of the average value of the posterior distribution and a largeness of the variance of the posterior distribution are evaluated.

In this manner, according to the present invention, the OSNR minimum value or the OSNR maximum value can be estimated without resulting in a local solution.

The invention according to a fourth aspect is the OSNR spectrum estimation apparatus according to the third aspect in which when an OSNR in a predetermined wavelength channel of the predetermined transmission line has already been estimated, the calculation unit starts calculation of an OSNR spectrum based on the OSNR.

In this manner, according to the present invention, the estimation of the OSNR spectrum can be completed with a further smaller number of measurements using the OSNR that has already been estimated, and the traffic can be reduced.

The invention according to a fifth aspect is the OSNR spectrum estimation apparatus according to the third aspect further including a determination unit configured to determine a modulation scheme that meets a criterion of the OSNR for enabling transmission in each wavelength channel and maximizes a data rate.

In this manner, according to the present invention, the optimal modulation scheme can be determined in accordance with the calculated OSNR spectrum.

The invention according to a sixth aspect is the OSNR spectrum estimation apparatus according to the fifth aspect in which the determination unit determines a modulation scheme in each wavelength channel in a collective manner or determines a modulation scheme that meets a criterion of the OSNR for each wavelength channel.

In this manner, according to the present invention, the modulation scheme can be determined in a short period of time when the OSNR is favorable.

The invention according to a seventh aspect is a method of estimating an OSNR spectrum, including causing an optical node to estimate an OSNR of a predetermined transmission line in a predetermined number of wavelength channels, the predetermined number being less than the number of all wavelength channels, and calculating an average value and a variance of an OSNR spectrum of all the wavelength channels and an OSNR minimum value or an OSNR maximum value from OSNRs of the predetermined number of wavelength channels estimated by the optical node.

In this manner, according to the present invention, the estimation of the OSNR spectrum of the transmission line can be completed with a small number of measurements and in a short period of time, and the traffic can be reduced.

The invention according to an eighth aspect is a program for causing a computer to execute causing an optical node to estimate an OSNR of a predetermined transmission line in a predetermined number of wavelength channels, the predetermined number being less than the number of all wavelength channels, and calculating an average value and a variance of an OSNR spectrum of all the wavelength channels and an OSNR minimum value or an OSNR maximum value from OSNRs of the predetermined number of wavelength channels estimated by the optical node.

In this manner, according to the present invention, the estimation of the OSNR spectrum of the transmission line can be completed with a small number of measurements and in a short period of time, and the traffic can be reduced.

Effects of the Invention

According to the present invention, it is possible to complete estimation of an OSNR spectrum of a transmission line with a small number of measurements and in a short period of time while maintaining accuracy, and reduce traffic.

DESCRIPTION OF EMBODIMENTS

An embodiment of the present invention will be described below with reference to the drawings.

In a network controller, it is essential to know the OSNR minimum value for each link, although it is not necessarily required to have OSNR data of all wavelength channels.

Thus, for estimation of the OSNR minimum value, a method of estimating an OSNR spectrum with a small number of measurements through wavelength channel switching is proposed. A purpose of the present embodiment is to significantly reduce the measurement time and the amount of data transferred to a network controller.

Figure 1:
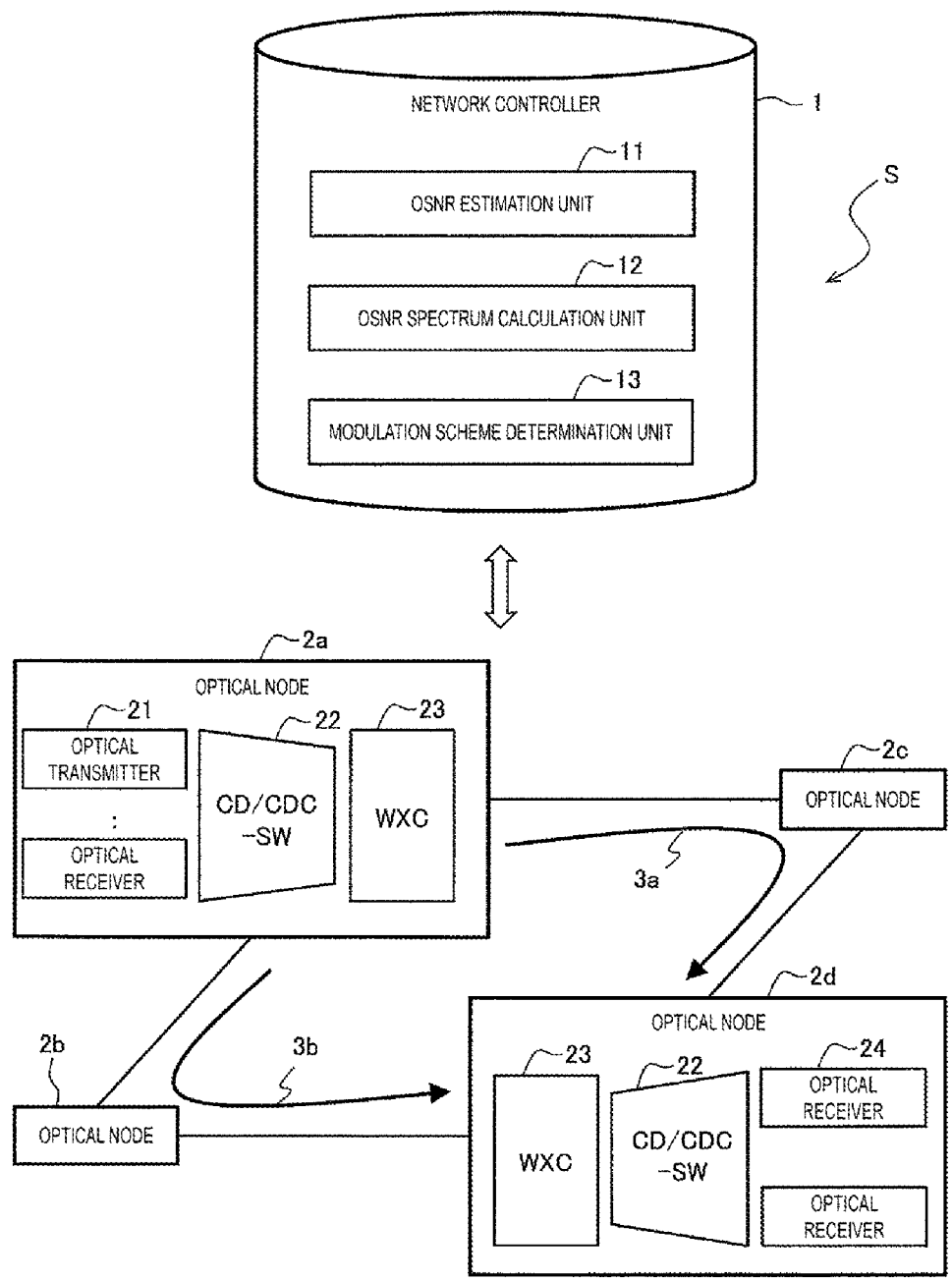
FIG. 1 is a schematic configuration diagram of an OSNR spectrum estimation system according to the present embodiment.

FIG. 1 is a schematic configuration diagram of an OSNR spectrum estimation system S according to the present embodiment.

The OSNR spectrum estimation system S includes a plurality of optical nodes 2a to 2d and a network controller 1 that comprehensively controls these optical nodes. A transmission line 3a is an optical bus from the optical node 2a as a starting point to the optical node 2d via the optical node 2c. A transmission line 3b is an optical bus from the optical node 2a as a starting point to the optical node 2d via the optical node 2b. Hereinafter, when these transmission lines are not distinguished from each other, they are simply referred to as a transmission line 3. When the 2a to 2d are not specifically distinguished from each other, they are simply referred to as an optical node 2.

The network controller 1 is a computer including a CPU and a storage unit (not illustrated), and the CPU executes a program stored in the storage unit to implement an OSNR estimation unit 11, an OSNR spectrum calculation unit 12, and a modulation scheme determination unit 13. The network controller 1 is communicatively coupled to the optical nodes 2a to 2d via a control plane (not illustrated), and controls the optical nodes 2a to 2d.

The OSNR estimation unit 11 instructs the optical node 2 to estimate (measure) an OSNR of the predetermined transmission line 3 using probe light of a predetermined wavelength in a predetermined wavelength channel. Specifically, the OSNR estimation unit 11 causes the optical node 2a at the starting end of the transmission line 3b to output probe light of a predetermined wavelength, and causes the optical node 2d at the terminal end of the transmission line 3b to estimate (measure) OSNR data of the transmission line 3b. The OSNR estimation unit 11 sets, as a wavelength channel to be measured next, a wavelength channel that gives the maximum value of an acquisition function in which the smallness of the average value of a posterior distribution and the largeness of the variance of the posterior distribution are evaluated.

The OSNR spectrum calculation unit 12 calculates the average value and the variance of the OSNR spectrum of all the wavelength channels and the OSNR minimum value from the OSNRs of a predetermined number of wavelength channels estimated (measured) by the optical node 2. Here, the number of wavelength channels estimated (measured) by the optical node 2 is less than the number of all the wavelength channels. Thus, the estimation of the OSNR spectrum of the transmission line can be completed in a short period of time while maintaining the accuracy, and further, the traffic can be reduced. The processing of the OSNR estimation unit 11 and the OSNR spectrum calculation unit 12 will be described in detail with reference to FIGS. 4, 10, and 11 described later.

The modulation scheme determination unit 13 determines the modulation scheme that meets the criterion of the OSNR for enabling transmission in each wavelength channel and maximizes the data rate. In this manner, the modulation scheme determination unit 13 can dynamically determine the optimal modulation scheme in each wavelength channel of each transmission line. This processing of the modulation scheme determination unit 13 will be described with reference to FIG. 9 described later.

The optical node 2 includes a plurality of optical transmitters 21, a colorless/directionless/contentionless switch (CD/CDC-SW) 22, a wavelength cross connect (WXC) unit 23, and a plurality of optical receivers 24. Note that FIG. 1 illustrates the optical transmitter 21, the CD/CDC-SW unit 22, and the WXC unit 23 used for transmission with the optical node 2a as the transmission side. Further, FIG. 1 illustrates the optical receiver 24, the CD/CDC-SW unit 22, and the WXC unit 23 used for reception with the optical node 2d as the receiving side.

The optical transmitter 21 transmits an optical signal of a predetermined wavelength. The optical receiver 24 operates as an optical spectrum analyzer that receives the optical signal of the predetermined wavelength, and estimates, from the received optical signal, OSNR data of the transmission line 3 (optical path) through which the optical signal (probe light) of the predetermined wavelength has passed.

The CD/CDC-SW unit 22 has the following three functions. The first function is a colorless function capable of adding/dropping an optical signal of an arbitrary wavelength. The second function is a directionless function capable of performing adding and dropping in an arbitrary direction. The third function is a contentionless function capable of adding/dropping optical signals of the same wavelength without causing collision. These three functions contribute to the efficiency of the network (wavelength routing), the flexibility in the device arrangement (space-saving by reducing device slots), and cost reduction. Note that the CD/CDC-SW unit 22 is applicable to the present embodiment even in the case where the contentionless function as the third function is not provided.

The WXC unit 23 divides a wavelength division multiplexing (WDM) signal into optical signals of respective wavelengths, and selects whether to pass through, drop, or add the optical signal after the division.

OSNR Spectrum Estimation Method by Means of Grid Search With reference to FIGS. 2 and 3, a description will be made to a method of estimating an OSNR spectrum by means of grid search in which estimation is repeated for all wavelength channels in a use wavelength band.

Figure 2:
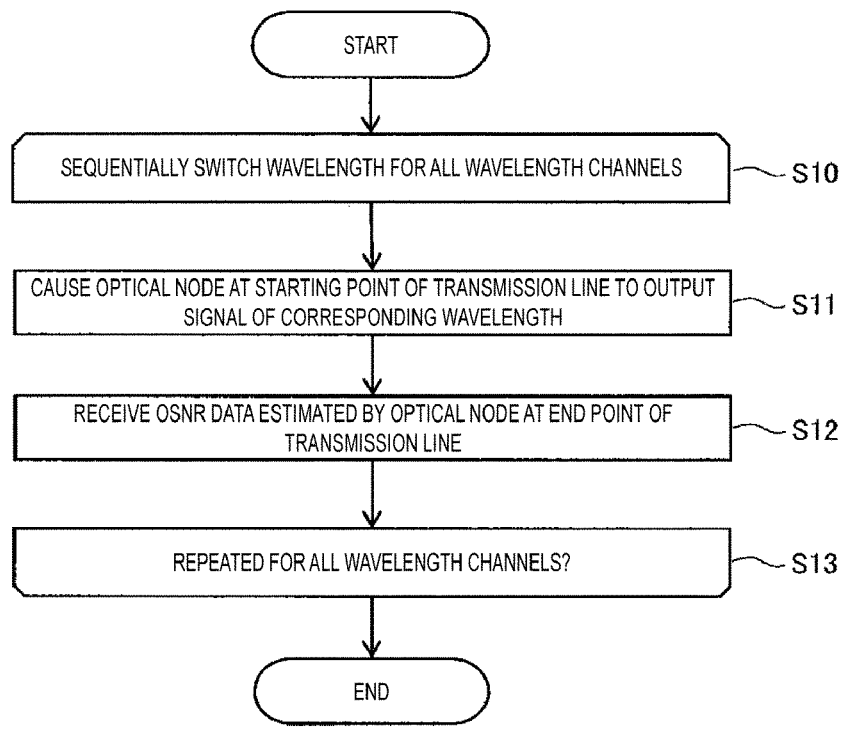
FIG. 2 is a flowchart of estimation of an OSNR by means of grid search.

FIG. 2 is a flowchart of estimation of an OSNR by means of grid search. The following description will be made by appropriately referring to FIG. 1.

The OSNR estimation unit 11 of the network controller 1 repeats processing of sequentially switching the wavelength for all the wavelength channels from steps S10 to S13.

The OSNR estimation unit 11 instructs the optical node 2 at the starting point of the transmission line 3 to output an optical signal having a corresponding wavelength (S11), and receives OSNR data estimated by the optical node 2 at the end point of the transmission line 3 (S12). Specifically, the starting point of the transmission line 3b is the optical node 2a illustrated in FIG. 1, and the end point is the optical node 2d, for example. The transmission line 3b is an optical path from the optical node 2a to the optical node 2d via the optical node 2b.

Then, the OSNR estimation unit 11 determines whether the processing has been repeated for all wavelength channels (S13). In this manner, it is possible to estimate an OSNR spectrum from the optical node 2a at the starting point to the optical node 2d at the end point of the transmission line 3b.

Figure 3:
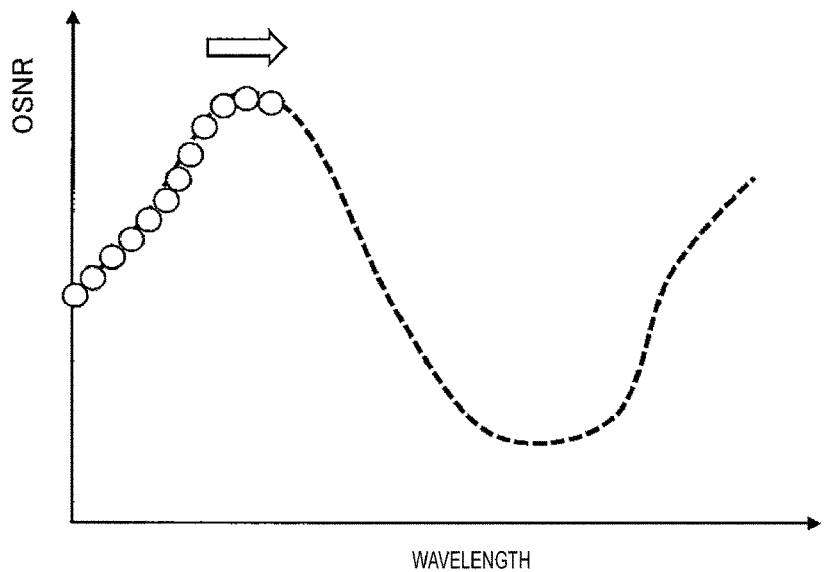
FIG. 3 is a diagram illustrating an operation of estimating an OSNR by means of the grid search.

FIG. 3 is a diagram illustrating an operation of estimating an OSNR by means of grid search.

In the graph, the horizontal axis indicates the wavelength channel and the vertical axis indicates the value of the OSNR. The dashed line indicates the OSNR, and the white circle indicates the OSNR estimation value of each wavelength channel. The arrow indicates that the estimation in each wavelength channel is sequentially repeated from the long wavelength to the short wavelength.

The feature of this estimation method is that the algorithm is simple and that the estimation accuracy is high. A problem with this estimation method is that the number of measurements is large and that the amount of measurement data to be transferred to and processed by the network controller 1 is large.

OSNR Spectrum Estimation Method of Present Embodiment In the present embodiment, the efficiency of the search for the wavelength and the OSNR minimum value with the optical spectrum analyzer is increased by means of Bayesian optimization. The network controller of the present embodiment calculates a posterior distribution of OSNR deviation for OSNR measurement data by means of the Gaussian process regression, and performs estimation by repeatedly determining an optimal search point based on an average value μ and a variance σ of the posterior distribution. In this manner, an estimation accuracy similar to that of the grid search is achieved, thereby reducing the number of wavelength channel switchings in the optical spectrum analyzer and the amount of measurement data to be transferred to and processed by the network controller.

Figure 4:
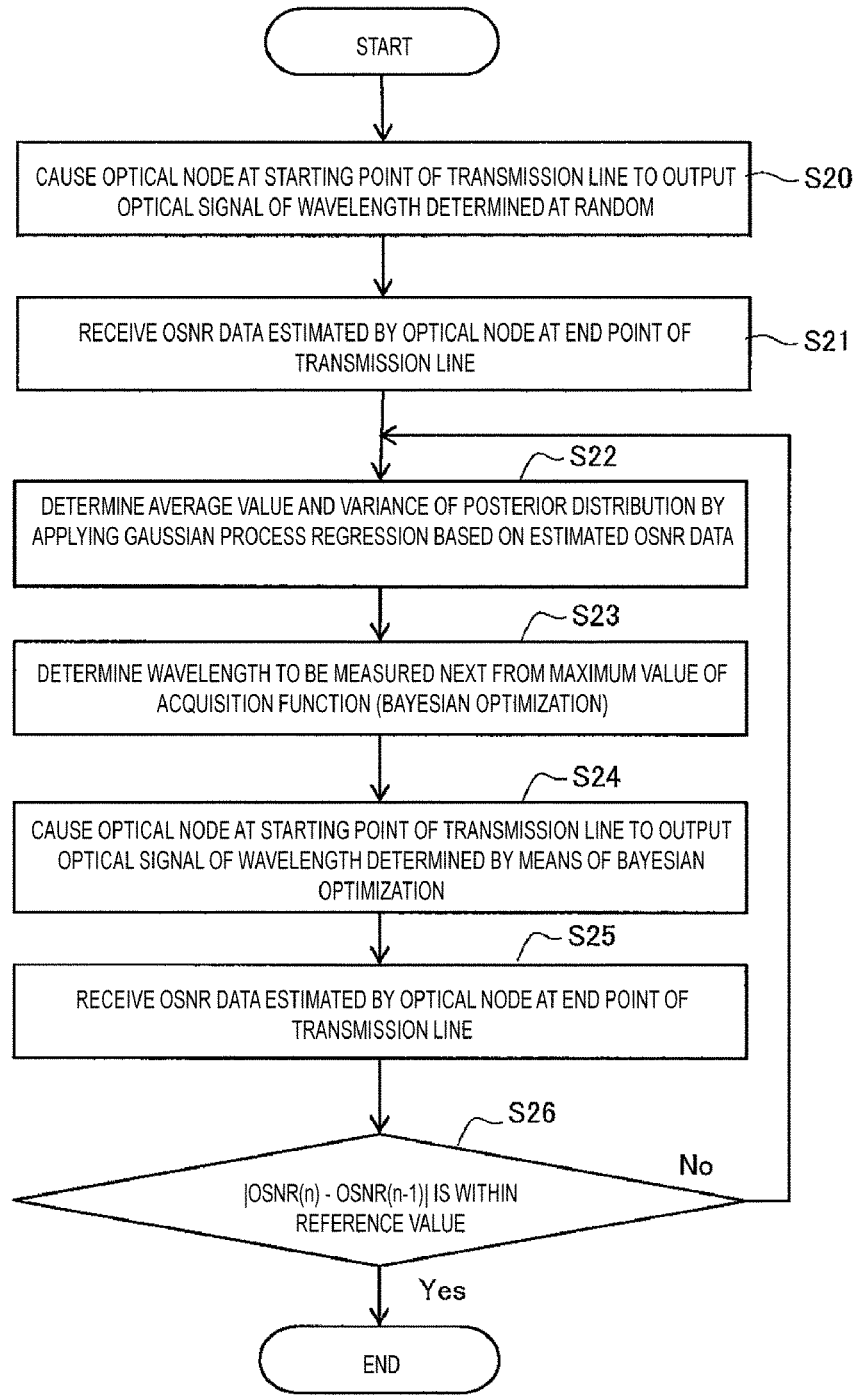
FIG. 4 is a flowchart illustrating processing of estimating an OSNR.

FIG. 4 is a flowchart illustrating processing of estimating an OSNR. The following description will be made by appropriately referring to FIG. 1.

First, the OSNR estimation unit 11 of the network controller 1 causes the optical node 2 at the starting point to output an optical signal of a wavelength determined at random (S20). The optical signal output by the optical node 2 at the starting point reaches the optical node 2 at the end point through the predetermined transmission line 3. The optical node 2 at the end point estimates OSNR data. Specifically, the starting point of the transmission line 3 is the optical node 2a illustrated in FIG. 1, for example. The end point of the transmission line 3 is the optical node 2d. The transmission line 3b is an optical path from the optical node 2a to the optical node 2d via the optical node 2b, for example.

The OSNR estimation unit 11 receives OSNR data estimated by the optical node 2 at the end point of the transmission line (S21).

Then, the OSNR spectrum calculation unit 12 determines an average value μ and a variance σ of a posterior distribution by applying the Gaussian process regression on the basis of the OSNR data estimated so far (S22). In this manner, the OSNR spectrum calculation unit 12 can calculate the average value and variance of the OSNR spectrum.

The OSNR estimation unit 11 determines a wavelength to be measured next from the maximum value of an acquisition function M (S23). This is a technique called Bayesian optimization.

The OSNR estimation unit 11 of the present embodiment determines a point (wavelength channel) to be measured next by the acquisition function in the upper confidence bound (UCB) strategy on the basis of the OSNR data estimated so far. Here, the UCB strategy is a strategy in which a point (wavelength channel) with the highest upper limit in a confidence interval of an evaluation value is measured next, and it is theoretically guaranteed that an optimal solution is derived.

Here, as shown in Equation (1), the acquisition function M is set to increase as the average value μ of the posterior distribution increases, and to increase as the variance σ of the posterior distribution increases. Note that k in Equation (1) is a constant.

[Equation 1]

$$M(x) = -\mu(x) + k \times \sigma(x) \quad (1)$$

In other words, the OSNR estimation unit 11 sets, as a wavelength channel to be measured next, a wavelength channel that gives the maximum value of the acquisition function in which the smallness of the average value of the posterior distribution and the largeness of the variance of the posterior distribution are evaluated.

Note that when a point in the vicinity of the point where the average value μ of the posterior distribution is small is selected as the next measurement point, it can be expected that the average value μ at that measured point also has a small value. However, if the determination is made based only on the average value μ, a local solution may be obtained, and thus it is also necessary to measure a point where the variance σ of the posterior distribution is large. The OSNR estimation unit 11 of the present embodiment measures points where the variance σ of the posterior distribution is large while especially measuring the vicinity of the OSNR minimum value.

Further, the OSNR estimation unit 11 may introduce a kernel function representing the degree of the mutual influence between measurement points to determine the next measurement point.

The OSNR estimation unit 11 causes the optical node 2 at the starting point of the transmission line 3 to output an optical signal having a wavelength determined by means of Bayesian optimization (S24), and receives OSNR data estimated (measured) by the optical node 2 at the end point of the transmission line 3 (S25).

Further, the OSNR estimation unit 11 estimates whether the absolute value of the difference between the most recently estimated OSNR data and the OSNR data estimated one time earlier than the most recently estimated OSNR data is within a reference value (S26). When the absolute value of the difference between the most recently estimated OSNR data and the OSNR data estimated one time earlier than the most recently estimated OSNR data is greater than the reference value (No), the OSNR estimation unit 11 returns to step S22 and repeats the processing. When the absolute value of the difference between the most recently estimated OSNR data and the OSNR data estimated one time earlier than the most recently estimated OSNR data is within the reference value (Yes), the OSNR estimation unit 11 terminates the processing of FIG. 4. The processing at step S26 determines whether the variance σ has converged in the vicinity of the OSNR minimum value.

Figure 5:
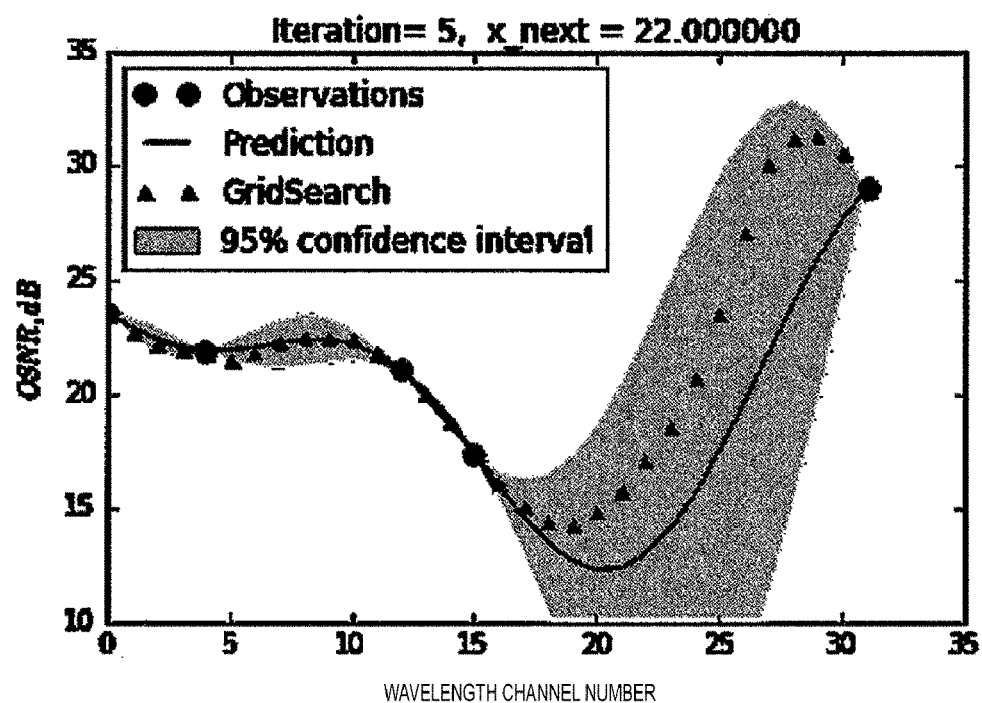
FIG. 5 is a graph illustrating a comparison between estimation results of the grid search and a fifth OSNR estimation operation.
Figure 6:
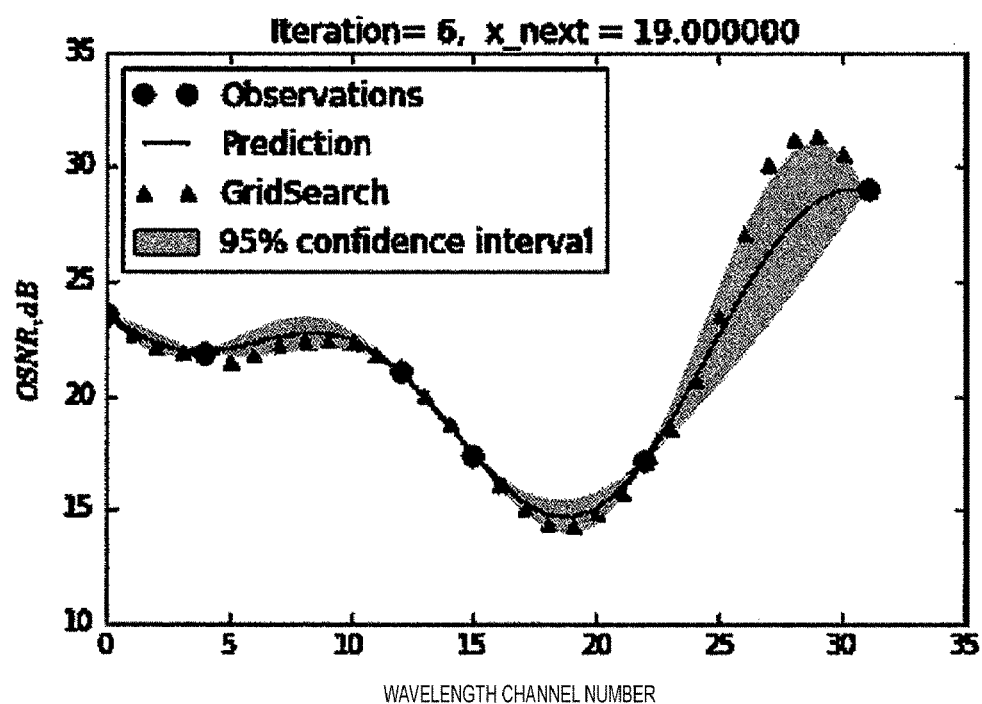
FIG. 6 is a graph illustrating a comparison between estimation results of the grid search and a sixth OSNR estimation operation.
Figure 7:
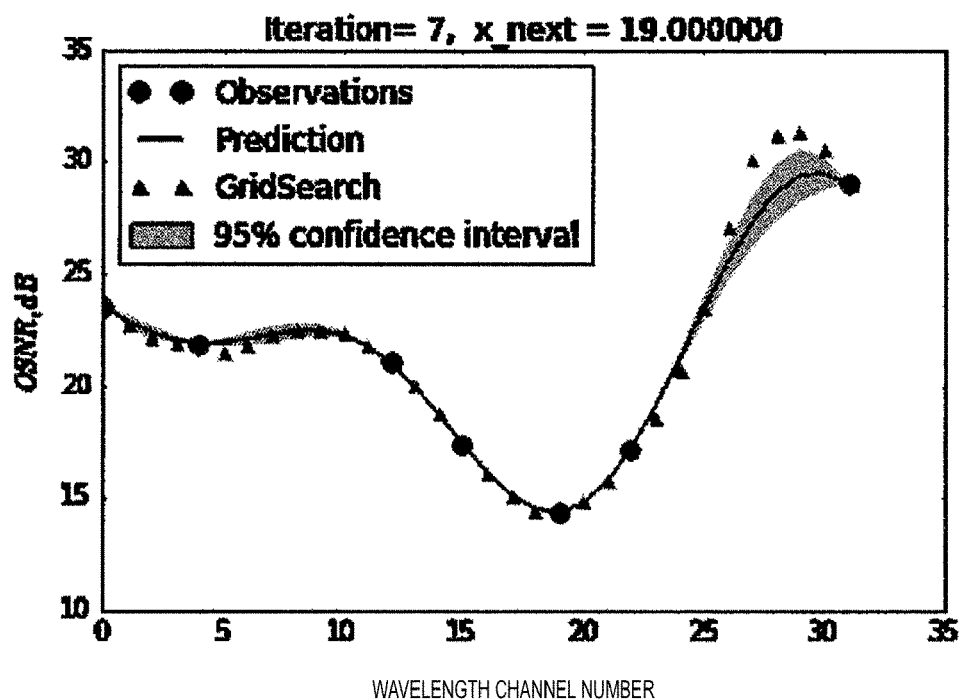
FIG. 7 is a graph illustrating a comparison between estimation results of the grid search and a seventh OSNR estimation operation.

Simulation results of the present embodiment are illustrated in FIGS. 5 to 7. This simulation evaluates an OSNR spectrum in a case where a signal of an intensity modulation-direct detection (IM-DD) scheme of a 10 Gbps is wavelength-multiplexed with 32 channels at intervals of 100 GHz, and then passed through an erbium doped optical fiber amplifier (EDFA) of a conventional-band (C-band) in five stages. In each EDFA, simulated amplification in the saturation region is performed.

FIG. 5 is a graph illustrating a comparison between the estimation results of the grid search and a fifth OSNR estimation operation.

As indicated in the legend, the circular icon indicates the measured (estimated) OSNR data, and the triangular icon indicates the OSNR data of each wavelength channel obtained through the grid search. The solid line indicates the average value μ of the posterior distribution. The hatching indicates the variance σ of the posterior distribution estimated with 95% accuracy. The "next=22.000000" shown on the top of the graph indicates that the wavelength channel number to be measured (estimated) next is 22.

FIG. 6 is a graph illustrating a comparison between the estimation results of the grid search and a sixth OSNR estimation operation.

In addition to the OSNR data illustrated in FIG. 5, the OSNR data of the 22th wavelength channel has been newly estimated. As a result, the average value μ of the posterior distribution indicated by the solid line and the variance σ of the posterior distribution indicated by the hatching approaches each OSNR data obtained through the grid search.

The "next=19.000000" shown on the top of the graph indicates that the wavelength channel number to be measured (estimated) next is 19.

FIG. 7 is a graph illustrating a comparison between the estimation results of the grid search and a seventh OSNR estimation operation.

In addition to the OSNR data illustrated in FIG. 5, the OSNR data of the 19th wavelength channel has been newly estimated. As a result, the average value μ of the posterior distribution indicated by the solid line and the variance σ of the posterior distribution indicated by the hatching further approaches each OSNR data obtained through the grid search.

In addition, since the absolute value of the difference between the OSNR data of the sixth estimation and the OSNR data of the seventh estimation is smaller than the reference value, the processing of estimating the OSNR spectrum is terminated.

The graphs illustrated in FIGS. 5 to 7 show that the OSNR spectrum of 32 wavelengths and the OSNR minimum value can be estimated with seven measurements. In this case, the measurement time and the amount of data can be reduced by 78% compared to the grid search.

According to the present embodiment, the OSNR minimum value can be searched for and the OSNR spectrum including the average value μ and the variance σ can be calculated. Thus, the OSNR minimum value can be determined, and the calculated OSNR spectrum can be used to select an optimal modulation/demodulation scheme for each wavelength channel.

Figure 8:
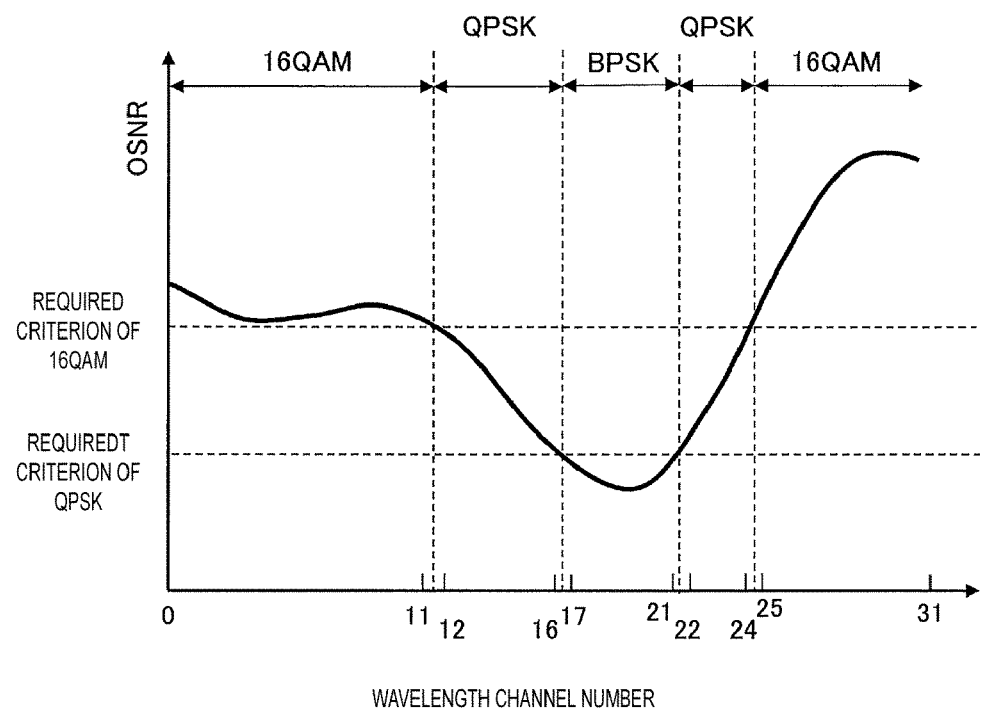
FIG. 8 is a graph illustrating an operation of selecting an optimal modulation/demodulation scheme for each wavelength channel.

FIG. 8 is a graph illustrating an operation of selecting an optimal modulation/demodulation scheme for each wavelength channel.

In the graph, the vertical axis indicates OSNR data and the horizontal axis indicates a wavelength channel number. Optimal modulation/demodulation schemes and ranges thereof are shown on the top of the graph.

The OSNR data of the wavelength channel numbers 0 to 11 meets the required criterion of 16 quadrature amplitude modulation (16QAM), and 16QAM is selected as the modulation/demodulation scheme. 16QAM is a scheme that can send 16 values of information with a single signal, and the required criterion of the OSNR is high while the transmission efficiency is favorable.

The OSNR data of the wavelength channel numbers 12 to 16 does not meet the required criterion of 16QAM but meets the required criterion of quadrature phase shift keying (QPSK), and thus, QPSK is selected as the modulation/demodulation scheme. QPSK is a scheme that can send four values of information with a single signal, and the required criterion of the OSNR is lower than that of 16QAM although the transmission efficiency is worse than 16QAM.

The OSNR data of the wavelength channel numbers 17 to 21 does not meet the required criterion of QPSK, and binary phase shift Keying (BPSK) is selected as the modulation/demodulation scheme. BPSK is a scheme that can send binary information with a single signal, and the required criterion is lowest among the transmission schemes although the transmission efficiency is worse than QPSK. Note that the description of the required criterion of BPSK is omitted in FIG. 8.

The OSNR data of the wavelength channel numbers 22 to 24 does not meet the required criterion of 16QAM, but meets the required criterion of QPSK, and thus, QPSK is selected as the modulation/demodulation scheme.

The OSNR data of the wavelength channel numbers 25 to 31 meets the required criterion of 16QAM, and 16QAM is selected as the modulation/demodulation scheme.

Figure 9:
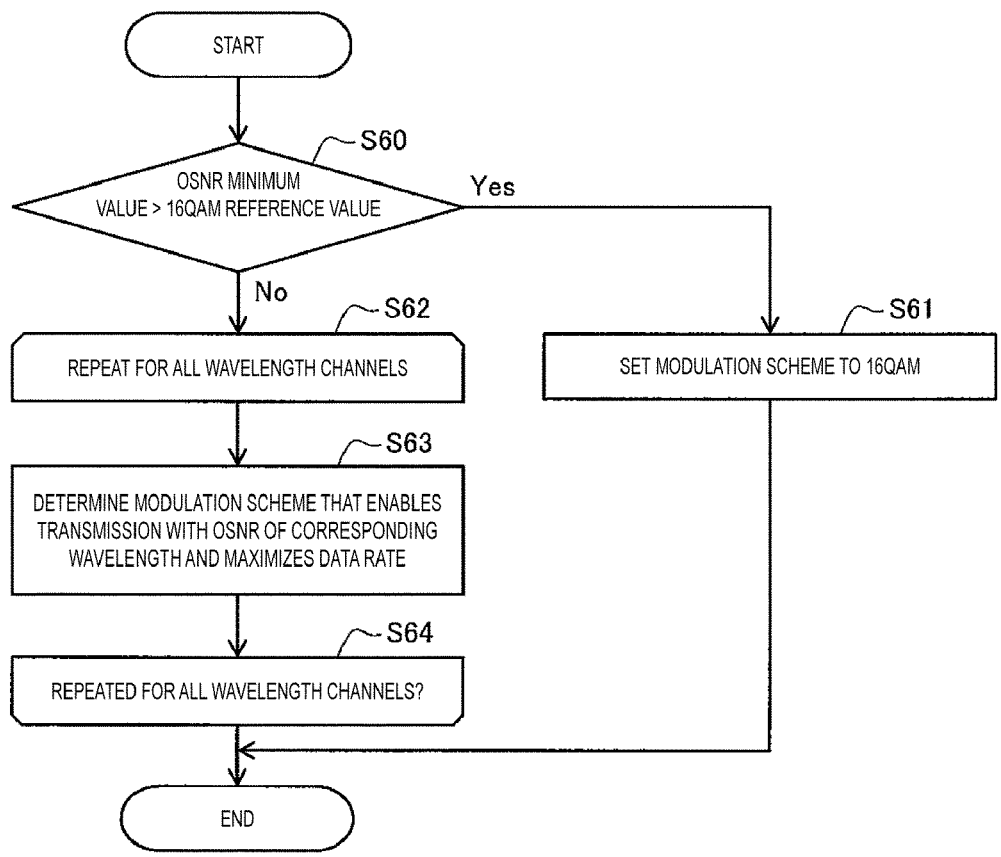
FIG. 9 is a flowchart illustrating processing of selecting an optimal modulation/demodulation scheme for each wavelength channel.

FIG. 9 is a flowchart illustrating processing of selecting an optimal modulation/demodulation scheme for each wavelength channel.

First, the modulation scheme determination unit 13 determines whether the minimum value of the OSNR spectrum meets a reference value of 16QAM (S60). When the minimum value of the OSNR spectrum meets the reference value of 16QAM (Yes), the modulation scheme determination unit 13 sets the modulation scheme of all wavelength channels to 16QAM (S61), and terminates the processing of FIG. 9. When the minimum value of the OSNR spectrum does not meet the reference value of 16QAM (No), the modulation scheme determination unit 13 proceeds the processing to step S62.

The modulation scheme determination unit 13 repeats the processing from steps S62 to S64 for all wavelength channels. In this repetition, the modulation scheme determination unit 13 determines a modulation scheme that is determined to enable transmission with the OSNR of a corresponding wavelength channel (S63) and maximizes the data rate, and repeats the processing until the processing is performed for all wavelength channels (S64).

At step S64, when the processing is repeated for all wavelength channels, the modulation scheme determination unit 13 terminates the processing of FIG. 9.

In this manner, the modulation scheme determination unit 13 can select the modulation/demodulation scheme that maximizes the bit rate while meeting a criterion of the OSNR for enabling transmission on the basis of the OSNR spectrum estimated in real time. In other words, the modulation scheme determination unit 13 determines the modulation scheme of the wavelength channels in a collective manner, or determines the modulation scheme that meets the criterion of the OSNR for each wavelength channel.

Figure 10:
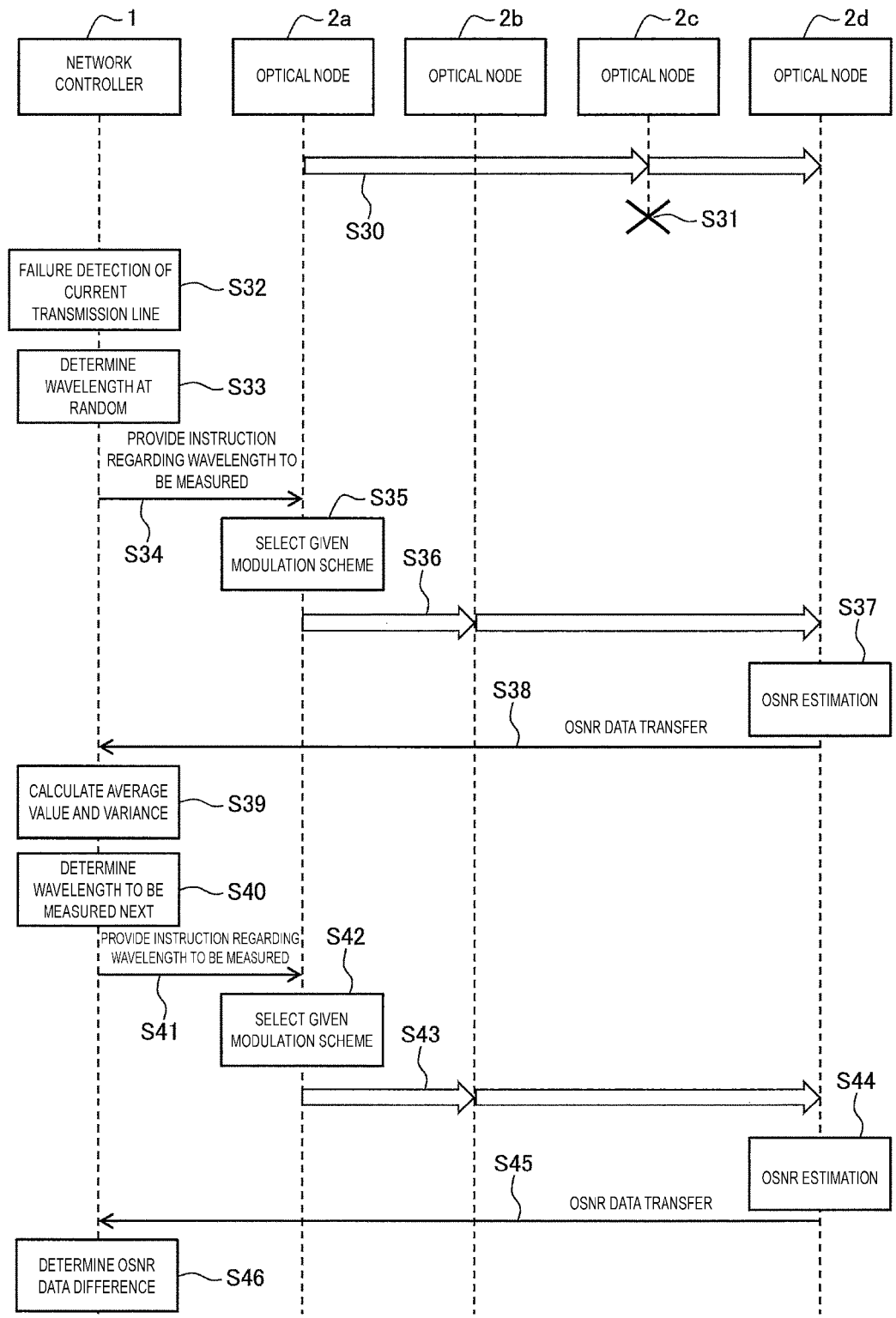
FIG. 10 is a sequence diagram illustrating processing of estimating an OSNR.

FIG. 10 is a sequence diagram illustrating processing of measuring an OSNR.

The case assumed here is an example in which a fault has occurred in the transmission line 3a (the optical node 2a→the optical node 2c→the optical node 2d), and thus restoration to the transmission line 3b (the optical node 2a→the optical node 2b→the optical node 2d) is performed.

Initially, the optical node 2a transmits an optical signal to the optical node 2d via the optical node 2c (S30). At this time, for example, a fault occurs in the optical node 2c (S31) and then the optical signal does not reach the optical node 2d.

When detecting the failure of the current transmission line 3a (S32), the network controller 1 executes an estimation sequence of an OSNR spectrum for the new transmission line 3b.

The network controller 1 determines a wavelength at random (S33), and provides an instruction regarding a wavelength channel to be measured to the optical node 2a at the starting point of the transmission line 3b (S34).

The optical node 2a at the starting point of the transmission line 3b selects a given modulation scheme (S35), and transmits an optical signal of this wavelength channel to the optical path that is the new transmission line 3b and reaches the optical node 2d via the optical node 2b (S36).

The optical node 2d at the end point of the transmission line 3b estimates OSNR data (S37), and transmits the estimated OSNR data to the network controller 1 (S38).

The network controller 1 determines the average value μ and the variance σ of the posterior distribution by applying the Gaussian process regression on the basis of the OSNR data estimated by the optical node 2d (S39), and determines a wavelength to be measured (estimated) next by means of Bayesian optimization (S40). Hereinafter, the operations of the sequences S41 to S45 are the same as the sequences S34 to S38 described above.

At sequence S46, the network controller 1 determines whether the absolute value of the difference between the most recently estimated OSNR data and the OSNR data estimated earlier than the most recently estimated OSNR data is a reference value or less. The same operations as those of the sequences S39 to S46 are repeated until this determination is satisfied. In this manner, the OSNR spectral property of the transmission line 3b (the optical node 2a→the optical node 2b→the optical node 2d) can be estimated, and further, the quality of transmission (QoT) can be predicted from the OSNR data of each wavelength channel in the restoration pass so as to select an optimal modulation scheme.

Here, the optical node 2 can change the wavelength of the optical signal output by the optical transmitter 21 without physically changing the connection by means of the colorless function of the reconfigurable optical add/drop multiplexer (CD/CDC-ROADM) on the premise that the optical node 2 is the CD/CDC-ROADM, in order to use a signal of a given modulation scheme that can be output by the optical transmitter 21 as probe light for the optimal modulation scheme search.

Figure 11:
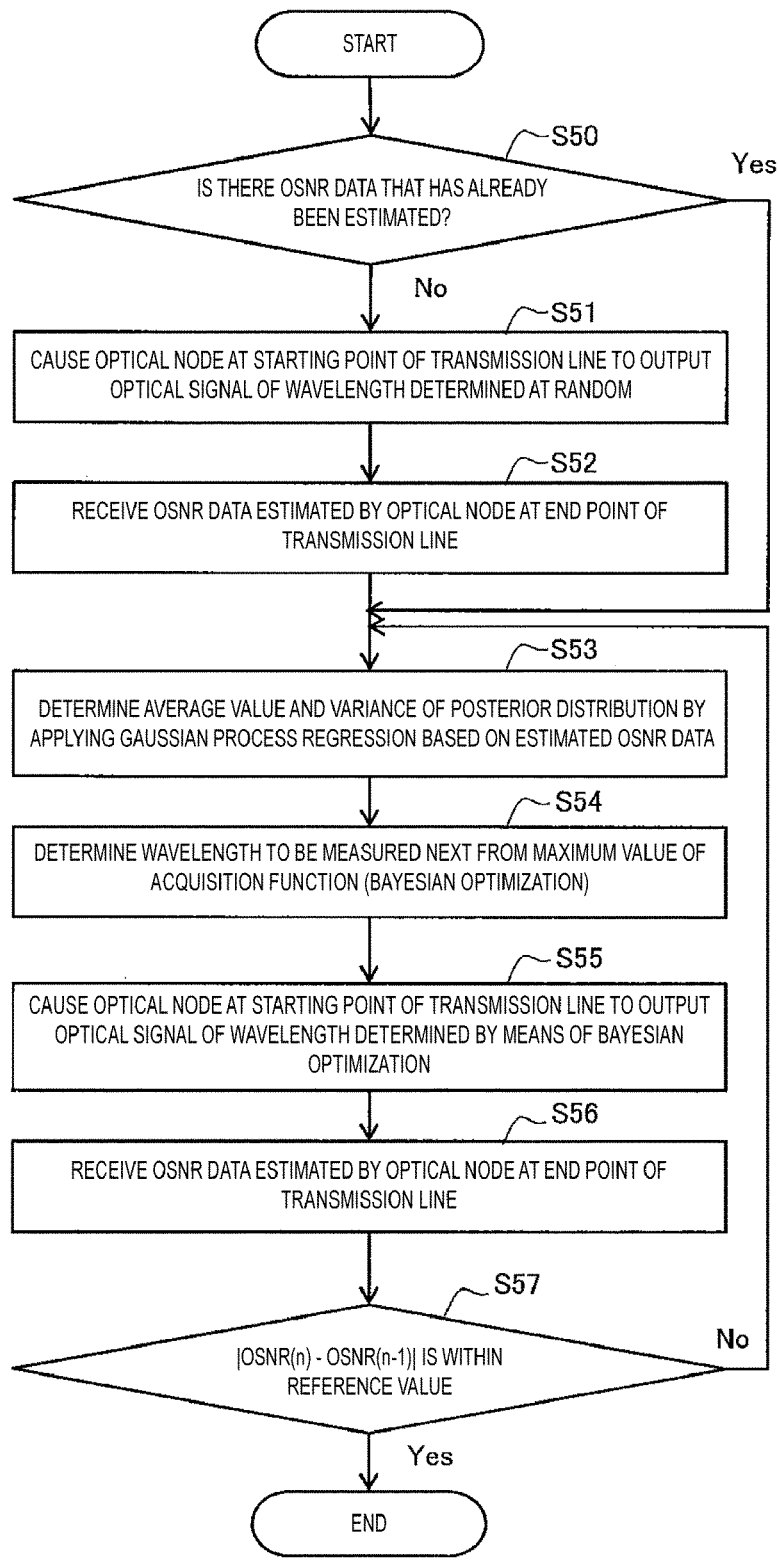
FIG. 11 is a flowchart illustrating processing of estimating an OSNR in the case where there is OSNR data that has already been estimated.

FIG. 11 is a flowchart illustrating processing of estimating an OSNR in a case where there is existing OSNR data, and is described appropriately referring to FIG. 1.

The OSNR estimation unit 11 of the network controller 1 determines whether there is OSNR data that has already been estimated (S50). When there is OSNR data that has already been estimated (Yes), the OSNR estimation unit 11 proceeds the processing to step S53. When there is no OSNR data that has already been estimated (No), the OSNR estimation unit 11 proceeds the processing to step S51.

At step S51, the OSNR estimation unit 11 causes the optical node 2 at the starting point to output an optical signal of a wavelength determined at random (S51). The optical signal output by the optical node 2 at the starting point reaches the optical node 2 at the end point through the predetermined transmission line 3. The optical node 2 at the end point estimates OSNR data. Specifically, the starting point of the transmission line 3 is the optical node 2a illustrated in FIG. 1, for example. The end point is the optical node 2d. The transmission line 3 at this time is an optical path from the optical node 2a to the optical node 2d via the optical node 2b, for example.

The OSNR estimation unit 11 receives the OSNR data estimated by the optical node 2 at the end point of the transmission line (S52).

At step S53, the OSNR spectrum calculation unit 12 determines the average value u and the variance σ of the posterior distribution by applying the Gaussian process regression on the basis of the estimated OSNR data. In this manner, the OSNR spectrum calculation unit 12 can calculate the average value and variance of the OSNR spectrum.

The OSNR estimation unit 11 determines a wavelength to be measured next from the maximum value of the acquisition function (S54). This is a technique called Bayesian optimization. Here, the acquisition function is set to increase as the average value μ of the posterior distribution increases, and to increase as the variance σ of the posterior distribution increases. In this manner, the vicinity of the OSNR minimum value is especially measured, and also the point where the variance σ of the posterior distribution is large is measured.

The OSNR estimation unit 11 causes the optical node 2 at the starting point of the transmission line to output an optical signal of a wavelength determined by means of Bayesian optimization (S55), and receives the OSNR data estimated (measured) by the optical node 2 at the end point of the transmission line (S56).

Further, the OSNR estimation unit 11 estimates whether the absolute value of the difference between the most recently estimated OSNR data and the OSNR data estimated one time earlier than the most recently estimated OSNR data is within a reference value (S57). When the absolute value of the difference between the most recently estimated OSNR data and the OSNR data estimated one time earlier than the most recently estimated OSNR data is greater than the reference value (No), the OSNR estimation unit 11 returns to step S53 and repeats the processing. When the absolute value of the difference between the most recently estimated OSNR data and the OSNR data estimated one time earlier than the most recently estimated OSNR data is within the reference value (Yes), the OSNR estimation unit 11 terminates the processing of FIG. 11. The processing at step S57 determines whether the variance σ has converged in the vicinity of the OSNR minimum value.

In this manner, when there is OSNR data that has already been estimated in the selected transmission line 3, the OSNR data can be used to further reduce the number of the OSNR measurements.

Modifications

The present invention is not limited to the above-described embodiment, and may be modified without departing from the spirit of the present invention. Examples of the modification include the following (a) to (f).

(a) The modulation/demodulation scheme enabling the optical node 2 to perform transmission and reception is not limited to 16QAM, QPSK, and BPSK. The modulation/demodulation scheme enabling the optical node 2 to perform transmission and reception may be another modulation/demodulation scheme such as 8 phase shift keying (8PSK) and 64QAM.

(b) The acquisition function is not limited to an acquisition function in the UCB strategy, and a point (wavelength) to be measured (estimated) next may be determined by an acquisition function by a probability of improvement (PI) strategy or an expected of improvement (EI) strategy.

(c) The acquisition function is not limited to Equation (1). Any equation that reflects the smallness of the average value μ and the largeness of the variance σ may be used.

(d) The termination condition for the OSNR spectrum estimation processing is not limited to the processing of step S26 of FIG. 4, and the processing may be terminated when a predetermined percentage of the OSNR data is estimated among all the frequency channels, for example.

(e) The values calculated by the OSNR spectrum calculation unit are not limited to the average value and variance of the OSNR spectrum and the OSNR minimum value, and it is possible to calculate the average value and variance of the OSNR spectrum and the OSNR maximum value.

(f) The configuration of the optical node 2 illustrated in FIG. 1 is an example. The optical node 2 may have a configuration other than that of FIG. 1, and is not limited.

REFERENCE SIGNS LIST

S OSNR spectrum estimation system
1 Network controller
11 OSNR estimation unit (estimation unit)
12 OSNR spectrum calculation unit (calculation unit)
13 Modulation scheme determination unit (determination unit)
2, 2a to 2d Optical node
21 Optical transmitter
22 CD/CDC-SW unit
23 WXC unit
24 Optical receiver
3, 3a, 3b Transmission line (optical path)

The invention claimed is:

1. An optical signal to noise ratio (OSNR) spectrum estimation apparatus comprising:
an estimation unit, including one or more processors, configured to cause an optical node to estimate an OSNR of a predetermined transmission line in a predetermined number of wavelength channels, the predetermined number of wavelength channels being less than the number of all wavelength channels; and
a calculation unit, including one or more processors, configured to calculate i) an average value and a variance of an OSNR spectrum of all the wavelength channels, and ii) an OSNR minimum value or an OSNR maximum value from OSNRs of the predetermined number of wavelength channels estimated by the optical node,
wherein the estimation unit is further configured to set, as a wavelength channel to be measured next, a wavelength channel, from the predetermined number of wavelength channels, that gives a maximum value of an acquisition function in which a smallest value of the average value and the largest value of the variance are evaluated.

2. The OSNR spectrum estimation apparatus according to claim 1, wherein the calculation unit is configured to calculate the OSNR spectrum of all the wavelength channels by determining an average value and a variance of a posterior distribution by Gaussian process regression based on an OSNR measurement result.

3. The OSNR spectrum estimation apparatus according to claim 2, wherein the wavelength channel to be measured next gives the maximum value of the acquisition function in which the smallest value of the average value of the posterior distribution and the largest value of the variance of the posterior distribution are evaluated.

4. The OSNR spectrum estimation apparatus according to claim 3, wherein when an OSNR in a predetermined wavelength channel of the predetermined transmission line has already been estimated, the calculation unit is configured to start calculation of an OSNR spectrum based on the estimated OSNR.

5. The OSNR spectrum estimation apparatus according to claim 3, further comprising a determination unit, including one or more processors, configured to determine a modulation scheme that meets a OSNR criterion for enabling transmission in each wavelength channel of the predetermined number of wavelength channels and maximizes a data rate.

6. The OSNR spectrum estimation apparatus according to claim 5, wherein the determination unit is configured to determine a modulation scheme in each wavelength channel of the predetermined number of wavelength channels in a collective manner or determine a modulation scheme that meets the OSNR criterion for each wavelength channel of the predetermined number of wavelength channels.

7. A method of estimating an OSNR spectrum, the method comprising:
causing an optical node configured to estimate an OSNR of a predetermined transmission line in a predetermined number of wavelength channels, the predetermined number of wavelength channels being less than the number of all wavelength channels;
calculating an average value and a variance of an OSNR spectrum of all the wavelength channels and an OSNR minimum value or an OSNR maximum value from OSNRs of the predetermined number of wavelength channels estimated by the optical node; and
setting, as a wavelength channel to be measured next, a wavelength channel, from the predetermined number of wavelength channels, that gives a maximum value of an acquisition function in which a smallest value of the average value and the largest value of the variance are evaluated.

8. The OSNR spectrum estimation method according to claim 7, further comprising calculating the OSNR spectrum of all the wavelength channels by determining an average value and a variance of a posterior distribution by Gaussian process regression based on an OSNR measurement result.

9. The OSNR spectrum estimation method according to claim 8, wherein the wavelength channel to be measured next gives the maximum value of the acquisition function in which the smallest value of the average value of the posterior distribution and the largest value of the variance of the posterior distribution are evaluated.

10. The OSNR spectrum estimation method according to claim 9, further comprising:
when an OSNR in a predetermined wavelength channel of the predetermined transmission line has already been estimated, staring calculation of an OSNR spectrum based on the estimated OSNR.

11. The OSNR spectrum estimation method according to claim 9, further comprising:
determining a modulation scheme that meets a OSNR criterion for enabling transmission in each wavelength channel of the predetermined number of wavelength channels and maximizes a data rate.

12. The OSNR spectrum estimation method according to claim 11, further comprising:
determining a modulation scheme in each wavelength channel of the predetermined number of wavelength channels in a collective manner or determining a modulation scheme that meets the OSNR criterion for each wavelength channel of the predetermined number of wavelength channels.

13. A non-transitory computer readable medium storing one or more instructions causing a computer to execute:
causing an optical node to estimate an OSNR of a predetermined transmission line in a predetermined number of wavelength channels, the predetermined number of wavelength channels being less than the number of all wavelength channels;
calculating an average value and a variance of an OSNR spectrum of all the wavelength channels and an OSNR minimum value or an OSNR maximum value from OSNRs of the predetermined number of wavelength channels estimated by the optical node; and setting, as a wavelength channel to be measured next, a wavelength channel, from the predetermined number of wavelength channels, that gives a maximum value of an acquisition function in which a smallest value of the average value and the largest value of the variance are evaluated.

14. The non-transitory computer readable medium according to claim 13, wherein the one or more instructions further cause the computer to execute:

calculating the OSNR spectrum of all the wavelength channels by determining an average value and a variance of a posterior distribution by Gaussian process regression based on an OSNR measurement result.

15. The non-transitory computer readable medium according to claim 14, wherein the wavelength channel to be measured next gives the maximum value of the acquisition function in which the smallest value of the average value of the posterior distribution and the largest value of the variance of the posterior distribution are evaluated.

16. The non-transitory computer readable medium according to claim 15, wherein the one or more instructions further cause the computer to execute:

when an OSNR in a predetermined wavelength channel of the predetermined transmission line has already been estimated, staring calculation of an OSNR spectrum based on the estimated OSNR.

17. The non-transitory computer readable medium according to claim 15, wherein the one or more instructions further cause the computer to execute:

determining a modulation scheme that meets a OSNR criterion for enabling transmission in each wavelength channel of the predetermined number of wavelength channels and maximizes a data rate.

18. The non-transitory computer readable medium according to claim 17, wherein the one or more instructions further cause the computer to execute:

determining a modulation scheme in each wavelength channel of the predetermined number of wavelength channels in a collective manner or determining a modulation scheme that meets the OSNR criterion for each wavelength channel of the predetermined number of wavelength channels.

* * * * *